US007533398B2

(12) United States Patent
Cullinan et al.

(10) Patent No.: US 7,533,398 B2
(45) Date of Patent: May 12, 2009

(54) AUTOMATIC SELECTION OF ENCODING PARAMETERS FOR TRANSMISSION OF MEDIA OBJECTS

(75) Inventors: Sean Cullinan, Kingshill (VG); Michael Palmer, Alexandria, VA (US)

(73) Assignee: The Associated Press, Washington, DC (US)

( * ) Notice: Subject to any disclaimer, the term of this patent is extended or adjusted under 35 U.S.C. 154(b) by 1296 days.

(21) Appl. No.: 10/625,774

(22) Filed: Jul. 24, 2003

(65) Prior Publication Data

US 2004/0210930 A1    Oct. 21, 2004

Related U.S. Application Data

(60) Provisional application No. 60/398,609, filed on Jul. 26, 2002.

(51) Int. Cl.
*G06F 3/00* (2006.01)
(52) U.S. Cl. .......................... 725/37; 709/219; 709/247
(58) Field of Classification Search ................ 709/219, 709/247; 708/208; 375/240; 725/37
See application file for complete search history.

(56) References Cited

U.S. PATENT DOCUMENTS

| 5,557,320 | A | * | 9/1996 | Krebs ......................... 725/114 |
| 5,920,701 | A | * | 7/1999 | Miller et al. ................. 709/228 |
| 5,928,330 | A | * | 7/1999 | Goetz et al. ................. 709/231 |
| 6,014,694 | A | * | 1/2000 | Aharoni et al. ............. 709/219 |
| 6,477,707 | B1 | * | 11/2002 | King et al. .................... 725/97 |
| 6,674,477 | B1 | * | 1/2004 | Yamaguchi et al. ....... 348/387.1 |
| 6,760,916 | B2 | * | 7/2004 | Holtz et al. ................... 725/34 |
| 6,879,634 | B1 | * | 4/2005 | Oz et al. ................. 375/240.26 |
| 7,065,586 | B2 | * | 6/2006 | Ruttenberg et al. ......... 709/244 |
| 2002/0118756 | A1 | * | 8/2002 | Nakamura et al. ..... 375/240.17 |
| 2002/0144283 | A1 | * | 10/2002 | Headings et al. ............ 725/109 |
| 2005/0273514 | A1 | * | 12/2005 | Milkey et al. ............... 709/232 |

OTHER PUBLICATIONS

Hamosfakidis, A., et al.; A study of concurrency in MPEG-4 video encoder, publisher Queen Mary & Westfield Coll., London. This paper appears in: Multimedia Computing and Systems, 1998. Proceedings. IEEE Intl Conf., Jun. 28-Jul. 1, 1998.*
Using Turbine Video Encoder, Blue Pacific Software, Apr. 4, 2002, pp. 1-15.*
EETimes, "Pinnacle Systems Partners With Associated Press", PRNewswire, Mar. 31, 2003.
The Association of Electronic Journalists, Radio-Television News Directors Association & Foundation, "The New Way of Covering War: Panelists Discuss Newsgathering Advances", News Releases, Apr. 8, 2003.
Anush Yegyazarian, PC World.com, "Windows Media Makes Hollywood Play", Apr. 11, 2003.
TVTechnology.com, Newsroom Report: Phillip O. Keirstead, "Improving Life in the Newsroom", Apr. 7, 2003.

\* cited by examiner

*Primary Examiner*—Jeffrey Pwu
*Assistant Examiner*—Noel Beharry
(74) *Attorney, Agent, or Firm*—DLA Piper LLP (US)

(57) ABSTRACT

A system, method and computer program product for automatic selection of encoding parameters for transmission of media objects is provided. The method and computer program product involve the automatic selection of media encoding parameters based on editorial and technical contexts. Such contexts include time constraints, duration, size, quality, processing time and compression time. The media objects are then automatically encoded using these automatically selected parameters, and then transmitted from a remote site to one or more additional sites via a communications network.

22 Claims, 8 Drawing Sheets

FIG. 3A

A — Verify Connection Information

Connection Type to Be Used: [Single Channel ISDN ▼]

Connection Speed For Connection: 62.50 *kbps*
Average Speed For This Connection: 1136.65 *kbps*

☐ Use Prior Results for Calculations

Connection Selection Interface

FIG. 3B

B — Set Time/Encoding Parameters

Media MUST Be in By: [2:20 PM ▲▼]

○ Producer Preview        ◉ Average Quality
○ VHS Quality             ○ Good Quality Current Time: [2:15:08 PM]

Deadline Selection Interface

Connection Settings

Connection Options
Connection Name: [Single Channel ISDN]

○ FTP    ⦿ SnapUp
Port: [21]   —OR—   Block Size: [AUTO ▶]

Speed (bps): [64000]

Cost: $[0] Per [Min ▶]

Primary Port: [8888]
Secondary Port: [8889]

☑ Default Connection?
☐ VPN in Use?
☐ Satellite optimized   Send Buffer: [65536]

☐ Use Prior Results For Calculations
Current Avg: 142.0814 kbps
[Reset]

Encode Settings And Defaults
Min Low Res Bitrate: [50000] bps   Min Med Res Bitrate: [70000] bps   Min High Res Bitrate: [100000] bps Configure Static Settings and Choose One Default:

○ Producer Preview  [Low Res ▶]  [150000] bps   ⦿ Average Quality  [Medium Res ▶]  [400000] bps
○ VHS Quality       [Medium Res ▶]              ○ Good Quality     [Full Res ▶]    [600000] bps

[Cancel]          [Set Options]

Connection configuration interface

FIG.3C

Presentation of calculated encoding options to user

Metadata entry interface

Basic Processing Interface

Advanced Processing Interface

AUTOMATIC SELECTION OF ENCODING PARAMETERS FOR TRANSMISSION OF MEDIA OBJECTS

This application claims priority from U.S. Provisional Application No. 60/398,609, filed Jul. 26, 2002. The entirety of that provisional application is incorporated herein by reference.

BACKGROUND OF THE INVENTION

1. Field of the Invention

The present invention relates generally to transmission of media objects over computer networks, and more particularly to a method, system, and computer program product for automatically selecting encoding parameters for transmitting media objects.

2. Related Art

In the field of broadcast journalism, "on location" journalist (i.e., field reporters) must often transmit media objects (i.e., audio and/or video) recorded in the field to various sites, including their "home office" broadcast centers or studios. These audio and video clips must typically be transmitted over data communications networks as file objects. This transmission process requires that the on-location journalist make a number of highly technical decisions in order to deliver a file of optimum quality by a specific deadline or in a limited time window. These decisions involve time constraints, duration, size, quality, processing time and compression time (which are explained in more detail below).

In the field of broadcast journalism, time is important because editorial content must often be delivered in advance of air or production deadlines for appropriate review and inclusion in broadcasts. Time or age is also an inherent value of some news content.

Duration and size of the file objects' transmission is also important because of the cost of data transmission circuits from remote locations can be very high.

Similarly, the quality of the transmission is a priority, but can vary greatly depending on the durations and file sizes the journalist desires to transmit. Also, the amount of available bandwidth must be factored into this decision. ("Bandwidth" refers to the capacity to move information (i.e., data) and, in digital communications, is typically measured in bits per second (bps).) Oftentimes, large amounts of bandwidth are not available to journalists especially when reporting from remote locations.

Lastly, processing time for compression (if required) must also be considered. The time required to compress a file to a size suitable for some transmissions can be significant and depends on encoding format, duration of the full resolution media, and certain compression-related options (e.g., desired quality, image size and other like variables).

Therefore, given the above, what is needed is a system, method and computer program product for the automatic selection of encoding parameters for transmission of media objects.

SUMMARY OF THE INVENTION

The present invention meets the above-identified needs by providing a system, method and computer program product for the automatic selection of encoding parameters for the purpose of transmitting media objects. The present invention assists journalists in the field with making encoding decisions about the video and audio clips they desire to transmit. It transforms the conventional process—which currently involves journalist making highly technical decisions involving such factors as time constraints, duration, size, quality, processing time and compression time—into one where automatic decisions are made in order to deliver a media file object of optimum quality by a specific deadline or in a limited time window.

An advantage of the present invention is that, unlike prior systems that allow users to select from a finite list of coding and encoding options and then transmit the file, it takes into account the context of the sender (i.e., user). Further, the present invention narrows selections for the user or makes automatic selections based on context, thus simplifying use.

Another advantage of the present invention is that it allows journalists in the field to be optimally presented with a minimum number of choices based on the editorial context in which they are operating. This is advantageous considering that journalists typically cannot consider the complex interaction of multiple variables required to optimize their transmissions for their specific contexts. That is, they often do not have the expertise, knowledge or time required to perform the otherwise required complex calculations.

Yet another advantage of the present invention is that it prevents journalists from selecting encoding options that are not optimized for their specific context. As a result, missed deadlines, inappropriate media quality and high transmission costs which cannot be properly estimated are all avoided.

Further features and advantages of the present invention, as well as the structure and operation of various embodiments of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings.

FIGS. 3A-G are exemplary windows or screen shots generated by the graphical user interface of the present invention.

DETAILED DESCRIPTION

I. Overall Operation

Figure 1:
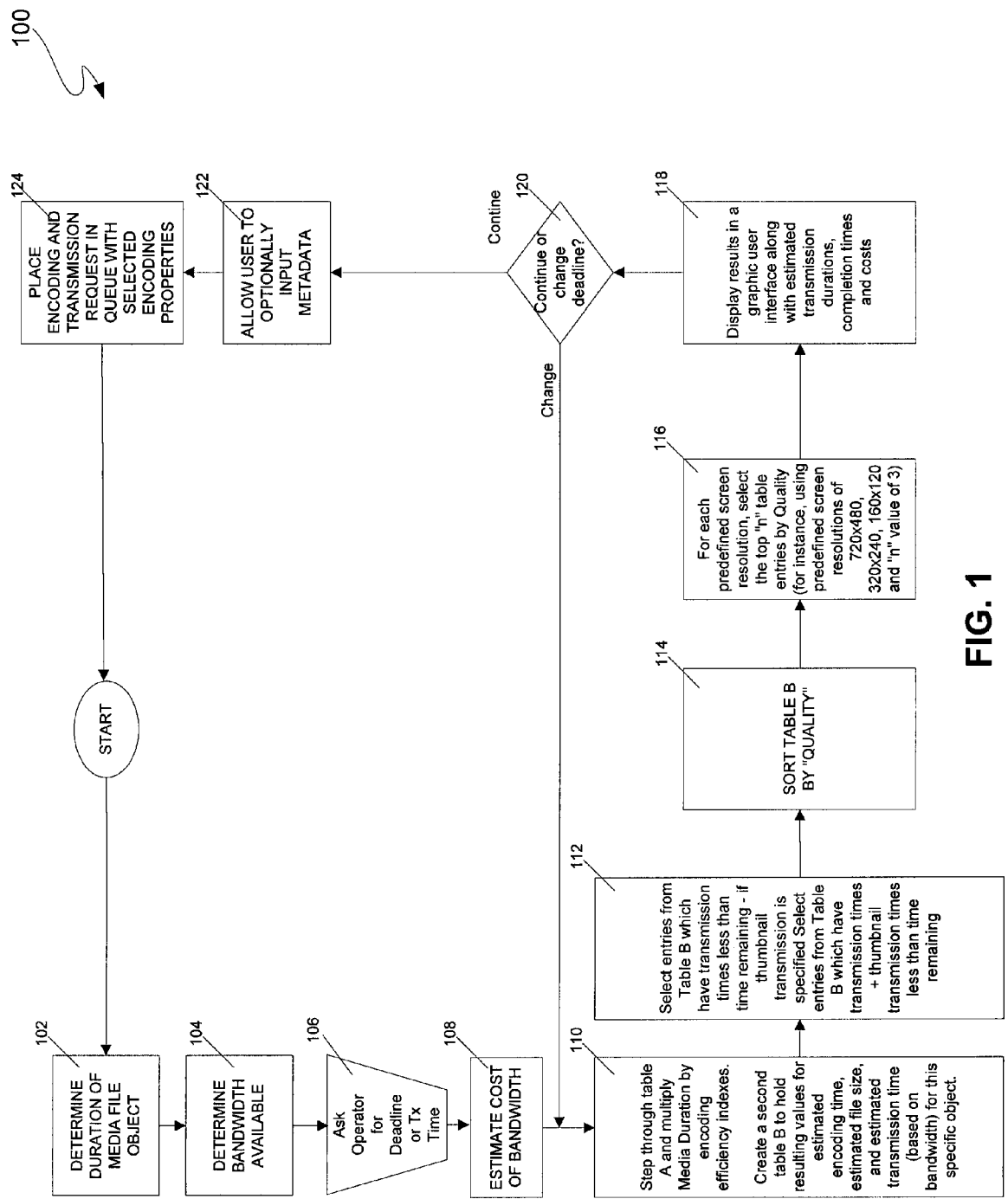
FIG. 1 is a flowchart depicting an embodiment of the operation of an automatic selection of encoding parameters for the purpose of transmitting media objects process of the present invention.

The present invention provides a system, method and computer program product for the automatic selection of encoding parameters for the purpose of transmitting such media objects. In an embodiment, users of the system of the present invention are presented with a graphical user interface (GUI) executing on any commercially-available processing device, including, but not limited to, a laptop computer, palmtop, personal digital assistant (PDA) and any other like (mobile) computing devices. As will be apparent to one skilled in the relevant art(s) after reading the description herein, such computing devices would have access to and be connected to at least one computer network (e.g., a wide area communications network such as the Internet, PSTN and the like) for transmission.

In an embodiment of the present invention, the conventional, highly complex decision-making process which has potentially thousands of resulting choices is reduced to a manageable number of choices that are appropriate to the immediate context of the operator (i.e., the journalist user). The method and computer program product perform the following steps:

(1) Asking the operator:
  (a) What is your deadline?; or
  (b) How much time do you have to transmit the file?
(2) Determining the running duration of the file object(s) if audio or video by:
  (a) automatically determining the value; or
  (b) asking the operator.
(3) Considering the amount of bandwidth available by:
  (a) automatically detecting the bandwidth;
  (b) asking the user; or
  (c) using a pre-configured setting.
(4) Considering the cost of the available bandwidth by:
  (a) looking up the value from a table which matches bandwidth to cost;
  (b) using a pre-configured setting; or
  (c) asking the user.

In an alternate embodiment of the present invention, steps (2), (3) and (4) can be automatically determined and thus the operator is only asked one question (i.e., step (1)): "What is your deadline?"

After performing steps (1)-(4), the present invention then is aware of the following three values related to the immediate context of the operator: (1) Time: (a) when the file transmission(s) should be complete; and (b) how much time remains between the present and the deadline; (2) Bandwidth: the expected or effective bandwidth available; and (3) Duration of the full resolution file object(s)—if audio or video.

In an embodiment, the system of the present invention is pre-configured with a table of file compression choices. Each choice reflects a variation in at least one of the following variables: (a) size of the file(s) rendered; (b) size of the image(s) rendered (if still or video); and (c) quality of the file(s) rendered (with audio and video being considered separately); (d) frame rate of the file(s) rendered (if video); and (e) the time required to compress source file(s) per unit time. The method and computer program product of the present invention then makes available to the user only those choices from the table which match the user's context (i.e., time, bandwidth and duration), including encoding and transmission time.

In an embodiment, the system of the present invention can be optionally configured to provide weight or priority in the selection process to variables (a)-(e) listed above, further reducing the number of choices to the user. In an alternate embodiment, the system of the present invention can be optionally configured to automatically select a single choice for the user, based on predefined and configurable settings which give specific weight and priority to variables (a)-(e) listed above.

Once a compression choice has been made by the user, the present invention will automatically encode the file(s) using the encoding parameters defined in the selected table choice and then automatically transmit the file. In an embodiment, the invention will also optionally separately transmit metadata which describes the file and transmission status to the receiving station.

In an embodiment, the present invention can be optionally configured to determine encoding times for each table entry based on actual results for each table entry on a specific machine (e.g., PDA, laptop, etc.). This is known as machine-specific calibration and is important because central processing units (CPUs) and other hardware-related parameters vary among computing devices.

In an embodiment, the present invention can be optionally configured to refine predictions and indexes of encoding efficiency for each table entry based on actual use (i.e., the method and computer program product "learns" over time).

In yet another embodiment, the present invention can be optionally configured to encode and transmit a very low resolution, highly compressed "thumbnail" image prior to encoding the image to the quality selected through the process described above. Encoding and transmission of the "thumbnail" media can be prior to or simultaneous with encoding and transmission of the primary file.

II. Detailed Example

The present invention is described in more detail below in terms of a user (e.g., a field broadcast journalist) being given access, via a GUI on a mobile processing device (e.g., laptop computer), to the tool the present invention provides for the automatic selection of encoding parameters for the purpose of transmitting audio and/or video media object files. This, however, is not intended to limit the application of the present invention. In fact, after reading the description herein, it will be apparent to one skilled in the relevant art(s) how to implement the invention in alternative embodiments (e.g., for use by those other than journalists, in other operating environments, etc.).

Referring to FIG. 1, a flowchart depicting an automatic selection of encoding parameters process 100 according to an embodiment of the present invention is shown. That is process 100 depicts the automatic selection of encoding parameters for the purpose of transmitting media objects. Process 100 begins at step 101 with control passing immediately to step 102.

In step 102, process 100 determines the duration of a specific media object to be encoded and transmitted according to the present invention. Step 102 is accomplished by loading the media object file into a media player available on the processing device which then returns the "play" duration of the file (if audio and/or video).

Figure 3D:
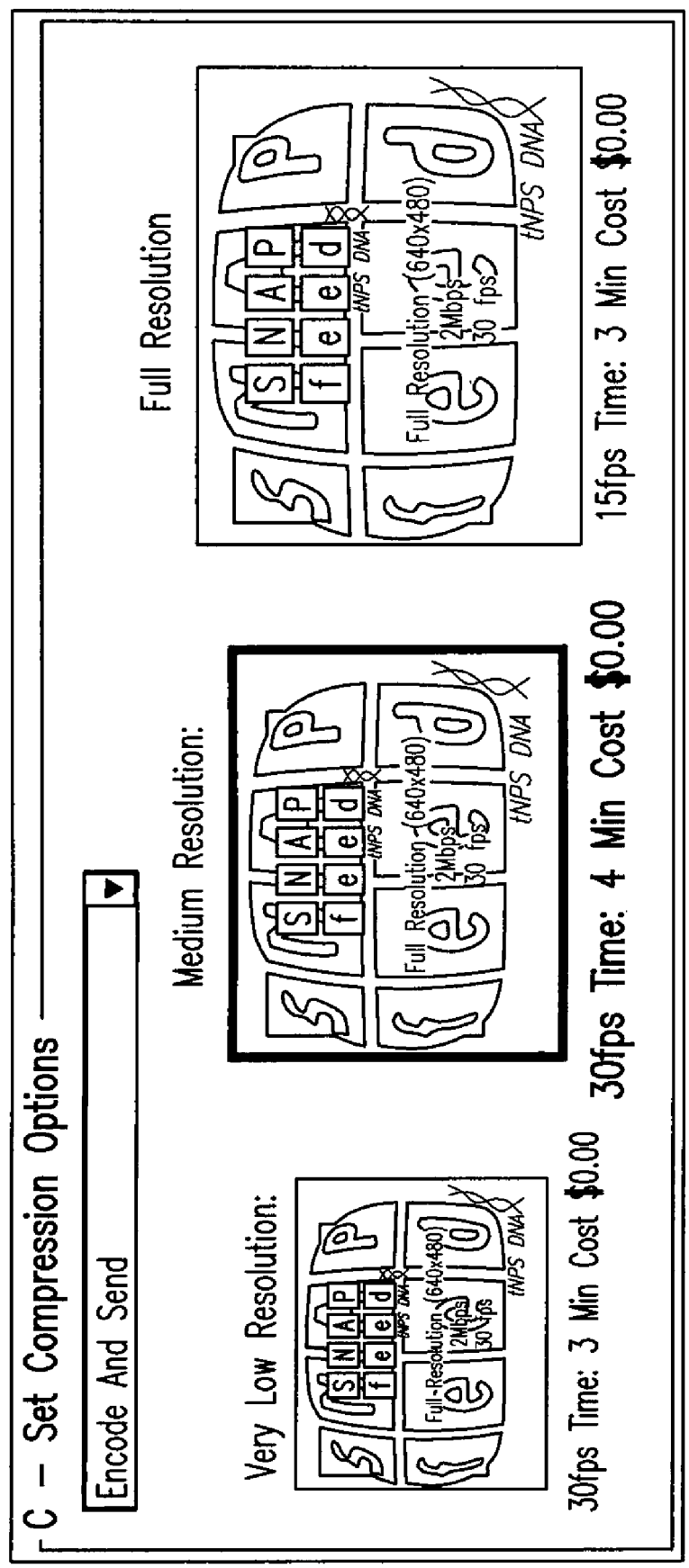

In step 104, process 100 determines the bandwidth available to the user. In one embodiment, process 100 executes in an "Auto" setting where the processing device's network adapters are queried to determine the connection speed. In an alternate embodiment, the user is given the option of manually selecting (from, for example, a menu or drop down list) the connection type they are using which contains information about the available bandwidth. (See FIG. 3A). Process 100 then updates the available bandwidth for each connection type available after every transmission to make this determination more accurate with each successive iteration of process 100.

In step 106, the user is presented with an interface that displays the estimated time that it will take for a media object to be encoded and sent based on a predefined baseline quality level. The user can then change the time to reflect their actual deadline. (See FIG. 3B).

In step 108, the user can specify to cost of each connection type based upon the time or data (i.e., media object) transferred. (See FIG. 3C). This information is then used to estimate the total cost of transmitting the media object based on either the time it will take to send the file, or the amount of data that the media object file contains.

Now that the deadline, duration, cost and bandwidth are known, it is possible to begin the calculations that will ensure the media object file arrives by the deadline specified in step 106. In an embodiment, there are two calculations to be made.

First, in step 110, the time it will take to encode the media file based on the central processing unit (CPU) speed of the user's processing device is calculated. In an embodiment this is done first because the time it takes to encode a file is independent of the bit rate used for the encoding and is only dependent on the resolution used for the file. The bit rates available are, however, dependent on the time remaining after the encoding of the media, as bit rate is a measurement of transfer speed over time. Using historical measurements, process 100 takes the past rate of encoding files and generates an estimated amount of time it will take to encode the current file for various resolution/frame rate choices.

In an embodiment, process 100 utilizes a table (i.e., a "Table A") to store the amount of time it will take to apply the compression to the specified file at each resolution. (As will be appreciated by those skilled in the relevant art(s), such a table or other suitable data structure or database can be stored in the memory of user's processing device and accessible to process 100.) The formula used to determine the encoding time is the past rate of encode stored in seconds of video/audio encoded per second of real time, multiplied by the duration of the media object file. This results in the amount of real time that it will take to encode the current file. This calculation is done for each supported resolution and frame rate.

An exemplary Table A utilized by process 100, in an embodiment, is shown below:

TABLE A

| Resolution/Frame Rate | Time to Encode |
|---|---|
| Resolution Choice__1/Full Frame Rate | Result of Formula A |
| Resolution Choice__2/Full Frame Rate | Result of Formula A |
| Resolution Choice__3/Full Frame Rate | Result of Formula A |
| Resolution Choice__n/Full Frame Rate | Result of Formula A |
| Resolution Choice__1/Half Frame Rate | Result of Formula A |
| Resolution Choice__2/Half Frame Rate | Result of Formula A |
| Resolution Choice__3/Half Frame Rate | Result of Formula A |
| Resolution Choice__n/Half Frame Rate | Result of Formula A |

In an embodiment, Formula A is:

$$T_h * D;$$

where: $T_h$ is the historical time (in seconds) it has taken to encode one second of video/audio on the user's processing device for the corresponding resolution/frame rate combination; and D is the duration (in seconds) of this media object file determined in step 102. As will be appreciated by those skilled in the relevant art(s), in an embodiment of the present invention the resolution choices for Table A are expressed in horizontal-by-vertical pixel values (e.g., 720×480, 320×240, 160×120, etc.). As will also be appreciated by those skilled in the relevant art(s), the historical times used in Formula A can be stored in the memory of user's processing device and accessible to process 100.

Once the time for the encode at each resolution and frame rate is known, it is possible to estimate the total amount of data that can be sent in the time remaining with the bandwidth specified in step 104. Thus, in an embodiment, the time remaining is calculated for each supported resolution/frame rate as the difference in seconds between the deadline and the present time, minus the time to encode. Here the bandwidth supplied in step 104 is used to calculate the total quantity of data that can be transmitted in the remaining time. This calculation is time remaining in seconds multiplied by the number of bits that can be transferred per second from the bandwidth supplied in step 104. (See Formula B below).

Now that the total quantity of data that can be transmitted in the remaining time is known for each resolution and frame rate, it is possible to determine how many bits of data can be used to represent each second of media content. This is commonly referred to as the media file's "bit rate." The media bit rate is calculated as the total number of bits that can be transmitted in the remaining time divided by the duration of the media object file that was derived in step 102. (See Formula B below). Generally speaking, a higher media bit rate results in a higher quality file from an audio-visual perspective.

The media bit rates that can be used for each resolution given the deadline, the encoding time and the duration of the file is then stored. In an embodiment, process 100 utilizes a second table (i.e., a "Table B") to store such bit rates. (As will be appreciated by those skilled in the relevant art(s), such a table, like Table A or any other suitable data structure or database, can be stored in the memory of user's processing device and accessible to process 100.)

An exemplary Table B utilized by process 100, in an embodiment, is shown below:

TABLE B

| Resolution/Frame Rate | Media Bit Rate |
|---|---|
| Resolution Choice__1/Full Frame Rate | Result of Formula B |
| Resolution Choice__2/Full Frame Rate | Result of Formula B |
| Resolution Choice__3/Full Frame Rate | Result of Formula B |
| Resolution Choice__4/Full Frame Rate | Result of Formula B |
| Resolution Choice__1/Half Frame Rate | Result of Formula B |
| Resolution Choice__2/Half Frame Rate | Result of Formula B |
| Resolution Choice__3/Half Frame Rate | Result of Formula B |
| Resolution Choice__4/Half Frame Rate | Result of Formula B |

In an embodiment, Formula B is:

$$((T_d - T_c) - T_e) * P/D;$$

where: $T_d$ is the deadline specified by the user in step 106; $T_c$ is the current time; $T_e$ is the time to encode (i.e., the result of Formula A stored in Table A); P is the bandwidth of the connection (in bits per second); and D is the duration of the media object file.

Certain resolution and frame rate settings may not be utilized given the specified bandwidth P (step 104) and deadline $T_d$ (step 106) if the media bit rate falls below a predefined minimum (e.g., a minimum bit rate defined by the user or user's broadcast organization). Thus, in step 112, process 100 utilizes the predefined minimum value and then tags or marks any resolution/frame rate setting in Table B where the media bit rate falls below the predefined minimum as "not available."

In an embodiment, the user may specify that a preview clip (e.g., "thumbnail") should be rendered and transmitted in addition to the production quality product. Thus, process 100 will first estimate the encode and transmit times for the preview clip using the steps described above. Then, these times for the preview clip are subtracted from the remaining time and a new remaining time value is used for the above calculations.

In step 114, the results listed in Table B which are not tagged "not available" in step 112 are sorted. In an embodiment, they are sorted in order of resolution and then frame rate.

In step 116, a pre-determined top n number (e.g., n=3) of entries from Table B which were sorted in step 114 are selected for presentation to the user.

In step 118, the user is then presented (via a GUI) with the n options for encoding and sending the media object file based on the calculations made in steps 110-116. (See FIG. 3D). This will provide the user with the ability to change one or more of the parameters if they are dissatisfied with the available choices.

In step 120, the user may change the deadline $T_d$ or the connection to be used for transmitting data (thus changing the bandwidth P) to increase the options available to them. If the user decides to change either of these options, then process 100 returns to step 110 so that steps 110-116 are repeated. Otherwise, process 100 proceeds to step 122.

Figure 3E:
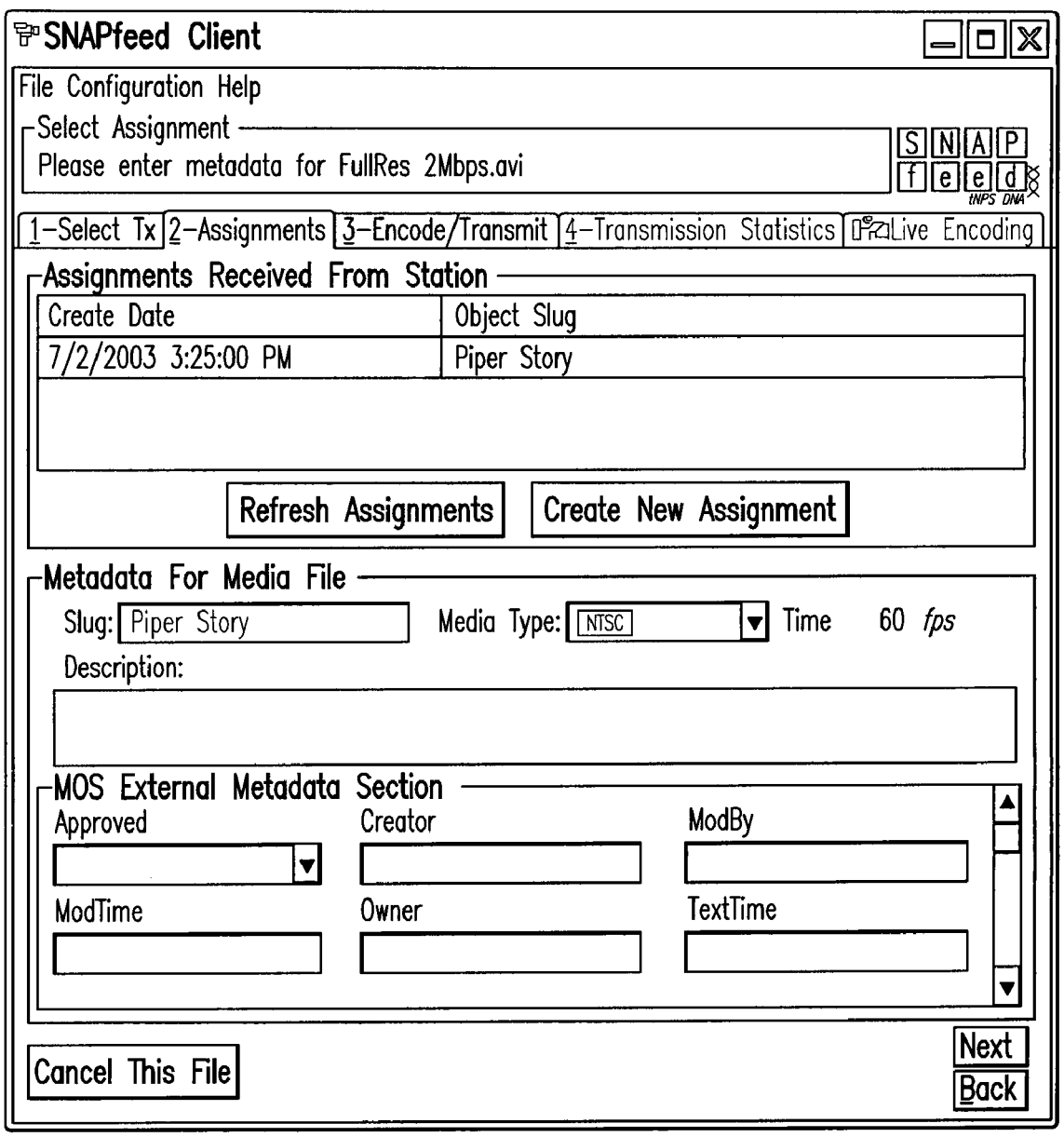

In step 122, metadata about the media object file being transmitted can be linked and also sent along with the media object file. In an embodiment, such metadata can include any definitional data such as owner name, text description and any other descriptive information about the context, quality and condition, or characteristics of the media object file. In an embodiment, such metadata are dynamic data fields that can be predefined by the user to support their organizational needs. (See FIG. 3E).

Figure 3F:
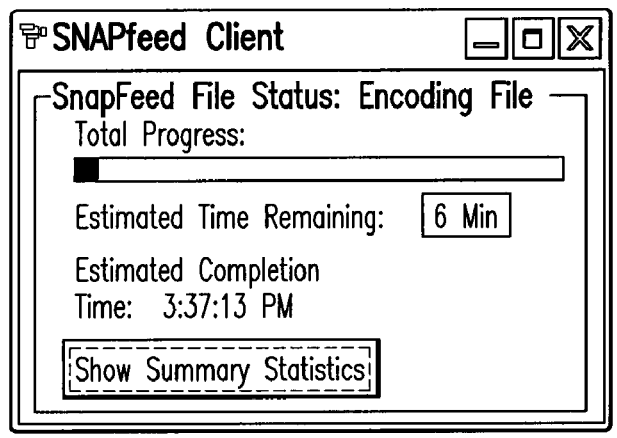
Figure 3G:
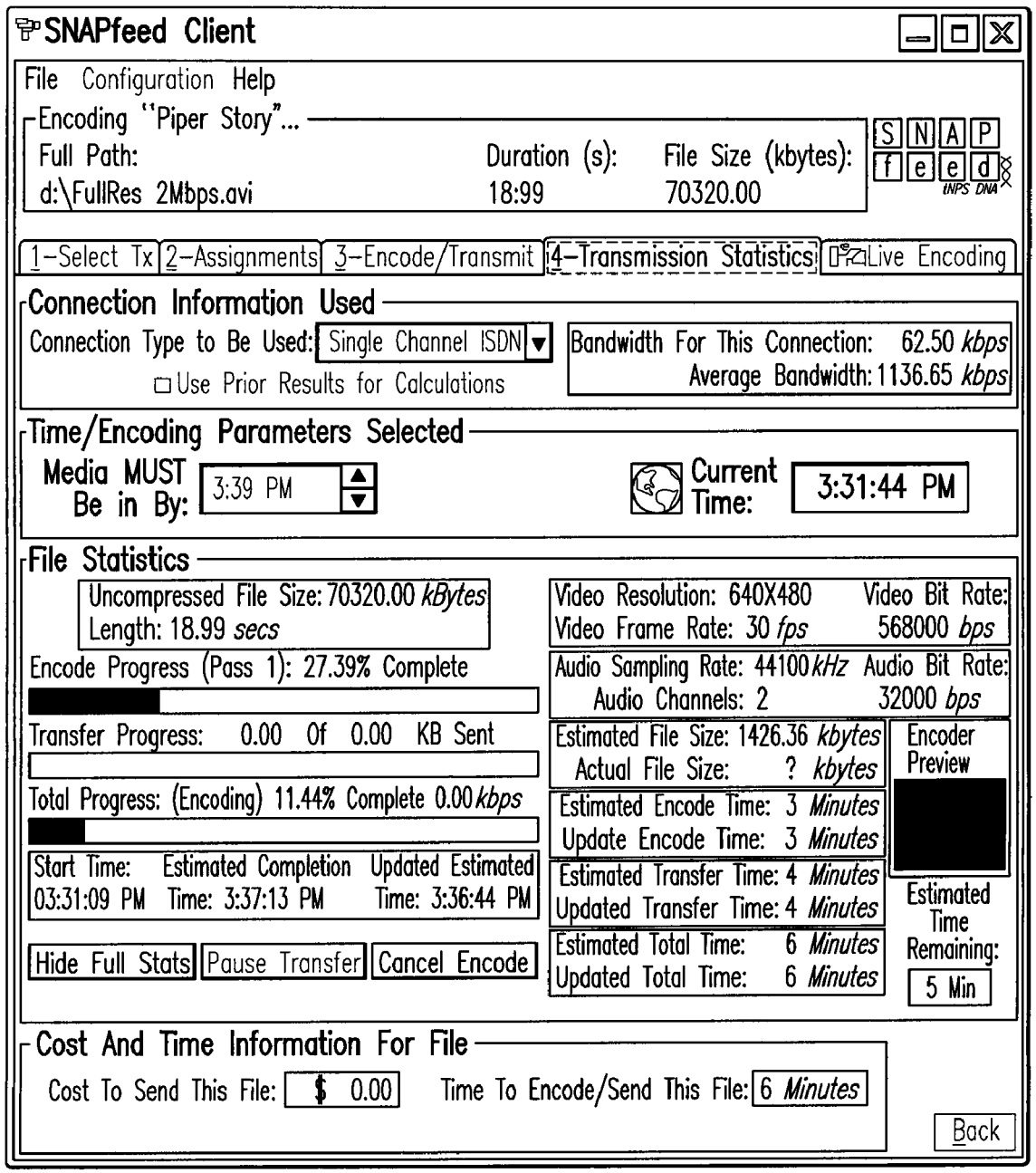

In step 124, the selected encoding and transmission request is placed on an encoding queue within the processing device with the selected encoding properties. That is, once all selections have been made and metadata set the file can be queued for encoding and eventual transmission. The user is then presented with the status of the encode/transmission process. (See FIGS. 3F-G).

Process 100 is then complete and returns to the beginning of its execution loop (by returning to step 101) as shown in FIG. 1.

Figure 2:
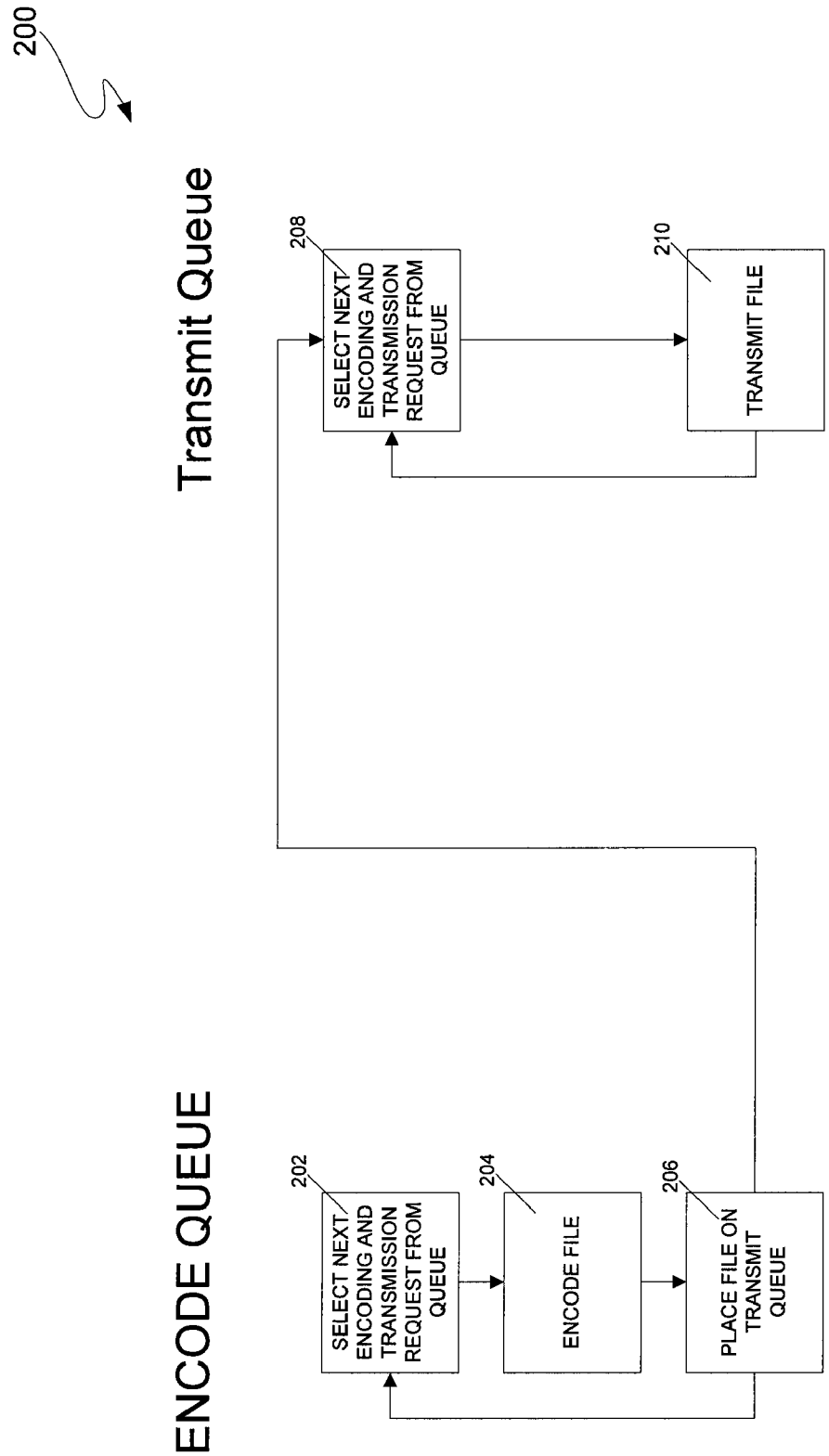
FIG. 2 is a flowchart depicting an embodiment of the encoding and transmission queuing process of the present invention.

Referring to FIG. 2, a flowchart depicting an encoding and transmission queuing process 200 according an embodiment of the present invention is shown. In an embodiment, process 200 executes on the user's processing device concurrently with process 100 and constantly monitor the progress of process 100. Thus, after the selected encoding and transmission request is placed in an encoding queue in step 124, step 202, when ready, selects the next media object file and removes it from the queue.

In step 204, the media object file is encoding using the properties selected during process 100. In an embodiment, the actual time to encode the media object using the properties selected during process 100 on the processing device is stored for use in refining or updating the historical time to encode values used in step 110 (e.g., using arithmetic mean or the like of actual encoding times to update the $T_h$ values used in Formula A).

Then, in step 206, the encoded media object file is placed on a transmit queue within the processing device. Finally, process 200, when ready, removes the encoded file from the transmit queue (step 208) and transmits the file from the user's processing device across the communications network (step 210).

Process 200 is then complete and returns to the beginning of its execution loops (by returning to steps 202 and 208) as shown in FIG. 2.

In an embodiment, because process 200 constantly monitors the progress of process 100, the user is able to receive a warning on the processing device if any media object file is in jeopardy of not making its specified deadline. In many cases, the user can then take corrective action. For example, if during encoding step 204, the processing device's CPU is handling other intensive processes that are slowing down the encoding, the user can be warned to cease such other processes if the load of the other operations puts their deadline (specified in step 106) in jeopardy. Likewise, if during transmission step 210, the processing device is using bandwidth for other applications, the user be warned to halt such operations if they begin to interfere with the transmission of the media object file.

III. Example Implementations

Figure 4:
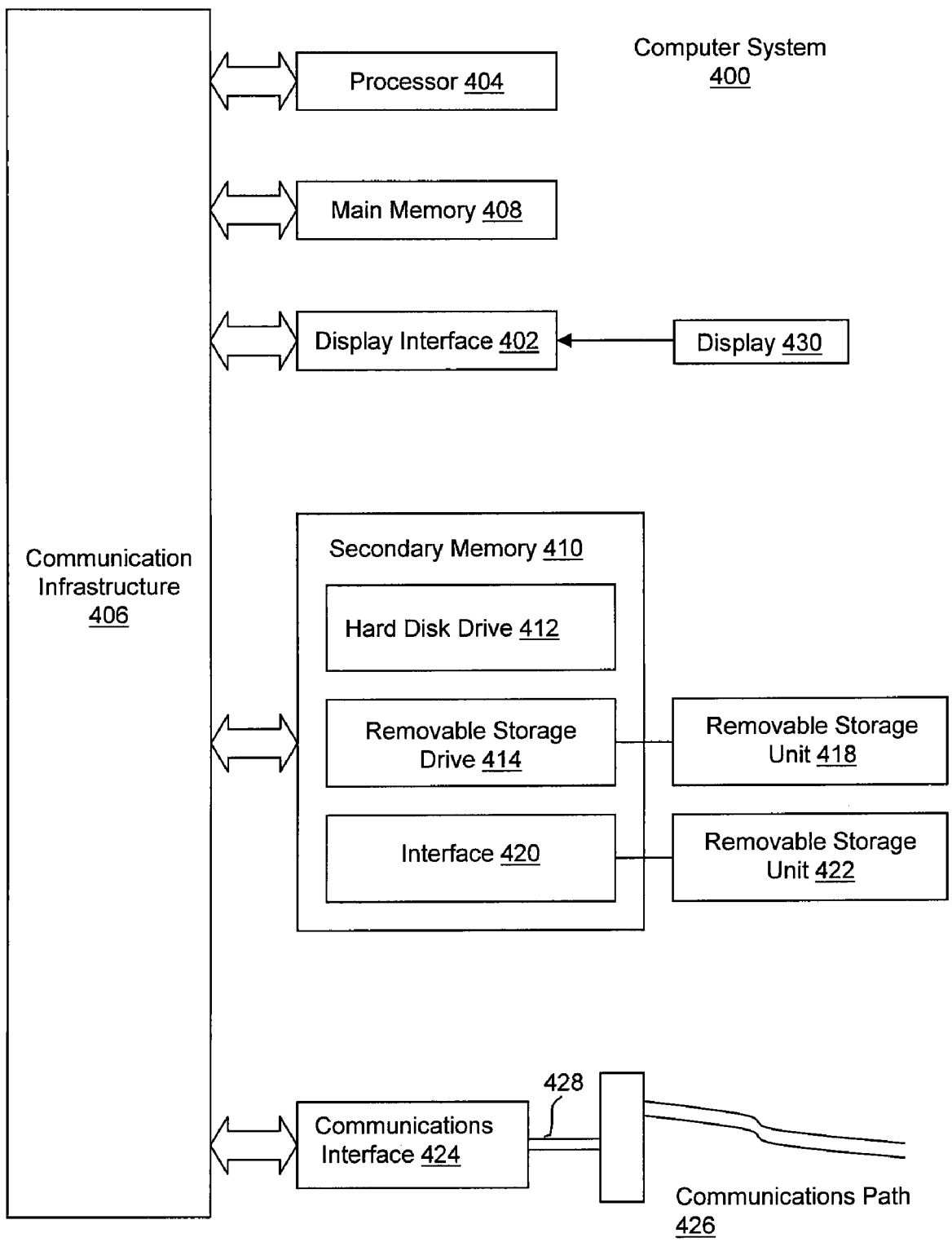
FIG. 4 is a block diagram of an exemplary computer system useful for implementing the present invention.

The present invention (i.e., process 100, process 200 or any portion(s) or function(s) thereof) may be implemented using hardware, software or a combination thereof and may be implemented in one or more computer systems or other processing systems. In fact, in one embodiment, the invention is directed toward one or more computer systems capable of carrying out the functionality described herein. An example of a computer system 400 is shown in FIG. 4.

Computer system 400 includes one or more processors, such as processor 404. The processor 404 is connected to a communication infrastructure 406 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 400 can include a display interface 402 that forwards graphics, text, and other data from the communication infrastructure 406 (or from a frame buffer not shown) for display on the display unit 430.

Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well known manner. Removable storage unit 418, represents a floppy disk, magnetic tape, optical disk, etc. which is read by and written to by removable storage drive 414. As will be appreciated, the removable storage unit 418 includes a computer usable storage medium having stored therein computer software and/or data.

In alternative embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428 which maybe electronic, electromagnetic, optical or other signals capable of being received by communications interface 424. These signals 428 are provided to communications interface 424 via a communications path (e.g., channel) 426. This channel 426 carries signals 428 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 414, a hard disk installed in hard disk drive 412, and signals 428. These computer program products provide software to computer system 400. The invention is directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features of the present invention, as discussed herein. In particular, the computer programs, when executed, enable the processor 404 to perform the features of the present invention. Accordingly, such computer programs represent controllers of the computer system 400.

In an embodiment where the invention is implemented using software, the software may be stored in a computer program product and loaded into computer system 400 using removable storage drive 414, hard drive 412 or communications interface 424. The control logic (software), when executed by the processor 404, causes the processor 404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IV. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

What is claimed is:

1. A method for selecting encoding parameters for the transmission of media objects from a processing device over a communications network, the method comprising the steps of:

determining a play duration value for a media object to be transmitted over the communications network;

determining a bandwidth value for transmitting said media object over the communications network;

receiving a first input indicative on a deadline time value in which said media object must be transmitted over the communications network;

calculating a plurality of encoding time values, each reflective of the time to encode said media object using one of a plurality of resolution and frame rate combinations;

calculating a plurality of bit rates, each corresponding to one of said plurality of encoding time values, using said play duration value, said bandwidth value and said deadline time value;

receiving a second input indicative of a selection of one of said plurality of bit rates, wherein said media object is transmitted over the communications network using one of said plurality of resolution and frame rate combinations corresponding to said selected bit rate;

accessing a data store containing a plurality of historical encode time values, each corresponding to one of said plurality of resolution and frame rate combinations; and calculating each of said plurality of encoding time values using the equation:

$$T_h * D;$$

wherein $T_h$ is one of said plurality of historical encode time values corresponding to one of said plurality of resolution and frame rate combinations; and D is said play duration value.

2. The method of claim 1, wherein each of said plurality of historical encode time values and said play duration value are measured in seconds.

3. The method of claim 1, further comprising the steps of:

encoding said media object using one of said plurality of resolution and frame rate combinations corresponding said selected bit rate; and updating said $T_h$ value corresponding to said one of said plurality of resolution and frame rate combinations.

4. The method of claim 1, wherein the bandwidth value is determined by accessing a historical communications network bandwidth value, the historical communications network bandwidth value being based on previous transmissions over the communications network.

5. The method of claim 4, further comprising the step of updating the historical communications network bandwidth value after a transmission over the communications network.

6. A method for selecting encoding parameters for the transmission of media objects from a processing device over a communications network, the method comprising the steps of:

determining a play duration value for a media object to be transmitted over the communications network;

determining a bandwidth value for transmitting said media object over the communications network;

receiving a first input indicative on a deadline time value in which said media object must be transmitted over the communications network;

calculating a plurality of encoding time values, each reflective of the time to encode said media object using one of a plurality of resolution and frame rate combinations;

calculating a plurality of bit rates, each corresponding to one of said plurality of encoding time values, using the equation:

$$((T_c - T_d) - T_e) * P/D;$$

wherein $T_c$ is said deadline time value; $T_d$ is the current time; $T_e$ is one of said plurality of encoding time values corresponding to said one of said plurality of resolution and frame rate combinations; P is said bandwidth value; and D is said play duration value;

receiving a second input indicative of a selection of one of said plurality of bit rates, wherein said media object is transmitted over the communications network using one of said plurality of resolution and frame rate combinations corresponding to said selected bit rate; and wherein said step of calculating said plurality of bit rates comprises the step of:

calculating each of said plurality of bit rates, each corresponding to one of said plurality of resolution and frame rate combinations.

7. The method of claim 6, further comprising the steps of:
rendering a preview clip of said media object;
determining a play duration value for said preview clip; and
calculating each of said plurality of bit rates using both said play duration value for said media object and said play duration value for said preview clip, wherein said preview clip is transmitted with said media object over the communications network.

8. The method of claim 6, wherein the bandwidth value is determined by accessing a historical communications network bandwidth value, the historical communications network bandwidth value being based on previous transmissions over the communications network.

9. The method of claim 8, wherein the processor is further configured to perform the step of updating the historical communications network bandwidth value after a transmission over the communications network.

10. A system for automatically selecting encoding parameters for the transmission of media objects, the system comprising:

a database for storing a plurality of encoding time values corresponding to a plurality of resolution and frame rate combinations, and a plurality of bit rates each corresponding to one of said plurality of resolution and frame rate combinations; and a processing device, comprising:
a network adapter connected to a communications network; and
a processor, wherein said processor is configured to perform the steps of:
determining a play duration value for a media object to be transmitted over said communications network;
determining a bandwidth value for transmitting said media object over said communications network;
receiving an input indicative on a deadline time value in which said media object must be transmitted over said communications network;
calculating said plurality of encoding time values, each reflective of the time to encode said media object using one of a plurality of resolution and frame rate combinations;
calculating said plurality of bit rates, each corresponding to one of said plurality of encoding time values, using the equation:

$$((T_c-T_d)-T_e)*P/D;$$

wherein $T_c$ is said deadline time value; $T_d$ is the current time; $T_e$ is one of said plurality of encoding time values corresponding to said one of said plurality of resolution and frame rate combinations; P is said bandwidth value; and D is said play duration value; and selecting one of said plurality of bit rates, wherein said media object is transmitted over said communications network using one of said plurality of resolution and frame rate combinations corresponding to said selected bit rate.

11. The system of claim 10, wherein said bandwidth value is determined by querying said network adaptor.

12. The system of claim 10, wherein said communications network comprises at least a portion of the Internet.

13. The system of claim 10, wherein said communications network comprises at least a portion of the PSTN.

14. The system of claim 10, wherein the bandwidth value is determined by accessing a historical communications network bandwidth value, the historical communications network bandwidth value being based on previous transmissions over the communications network.

15. The system of claim 14, wherein the processor is further configured to perform the step of updating the historical communications network bandwidth value after a transmission over the communications network.

16. A computer program product comprising a physical computer usable medium having control logic stored therein for causing a computer to selecting encoding parameters for the transmission of media objects from a processing device over a communications network, said control logic comprising:

first computer readable program code means for causing the computer to determine a play duration value for a media object to be transmitted over the communications network;

second computer readable program code means for causing the computer to determine a bandwidth value for transmitting said media object over the communications network;

third computer readable program code means for causing the computer to receive a first input indicative on a deadline time value in which said media object must be transmitted over the communications network;

fourth computer readable program code means for causing the computer to calculate a plurality of encoding time values, each reflective of the time to encode said media object using one of a plurality of resolution and frame rate combinations;

fifth computer readable program code means for causing the computer to calculate a plurality of bit rates, each corresponding to one of said plurality of encoding time values, using said play duration value, said bandwidth value and said deadline time value;

sixth computer readable program code means for causing the computer to receive a second input indicative of a selection of one of said plurality of bit rates, wherein said media object is transmitted over the communications network using one of said plurality of resolution and frame rate combinations corresponding to said selected bit rate;

seventh computer readable program code means for causing the computer to access a data store containing a plurality of historical encode time values, each corresponding to one of said plurality of resolution and frame rate combinations; and eighth computer readable program code means for causing the computer to calculate each of said plurality of encoding time values using the equation:

$$T_h*D;$$

wherein $T_h$ is one of said plurality of historical encode time values corresponding to one of said plurality of resolution and frame rate combinations; and D is said play duration value.

17. The computer program product of claim 16, wherein each of said plurality of historical encode time values and said play duration value are stored in seconds.

18. The computer program product of claim 16, further comprising:

ninth computer readable program code means for causing the computer to encode said media object using one of said plurality of resolution and frame rate combinations corresponding said selected bit rate; and tenth computer readable program code means for causing the computer to update said $T_h$ value corresponding to said one of said plurality of resolution and frame rate combinations.

19. A computer program product comprising a physical computer usable medium having control logic stored therein for causing a computer to selecting encoding parameters for the transmission of media objects from a processing device over a communications network, said control logic comprising:

first computer readable program code means for causing the computer to determine a play duration value for a media object to be transmitted over the communications network;

second computer readable program code means for causing the computer to determine a bandwidth value for transmitting said media object over the communications network;

third computer readable program code means for causing the computer to receive a first input indicative on a deadline time value in which said media object must be transmitted over the communications network;

fourth computer readable program code means for causing the computer to calculate a plurality of encoding time values, each reflective of the time to encode said media object using one of a plurality of resolution and frame rate combinations;

fifth computer readable program code means for causing the computer to calculate a plurality of bit rates, each corresponding to one of said plurality of encoding time values, using said play duration value, said bandwidth value and said deadline time value;

sixth computer readable program code means for causing the computer to receive a second input indicative of a selection of one of said plurality of bit rates, wherein said media object is transmitted over the communications network using one of said plurality of resolution and frame rate combinations corresponding to said selected bit rate; and seventh computer readable program code means for causing the computer to calculate each of said plurality of bit rates, each corresponding to one of said plurality of resolution and frame rate combinations, using the equation:

$$((T_c-T_d)-T_e)*P/D;$$

wherein $T_d$ is said deadline time value; $T_c$ is the current time; $T_e$ is one of said plurality of encoding time values corresponding to said one of said plurality of resolution and frame rate combinations; P is said bandwidth value; and D is said play duration value.

20. The computer program product of claim 19, further comprising:

eighth computer readable program code means for causing the computer to render a preview clip of said media object;

ninth computer readable program code means for causing the computer to determine a play duration value for said preview clip; and tenth computer readable program code means for causing the computer to calculate each of said plurality of bit rates using both said play duration value for said media object and said play duration value for said preview clip, wherein said preview clip is transmitted with said media object over the communications network.

21. The computer program product of claim 19, wherein the second computer readable program code means causes the computer to determine the bandwidth value by accessing a historical communications network bandwidth value, the historical communications network bandwidth value being based on previous transmissions over the communications network.

22. The computer program product of claim 21, further comprising eighth computer readable program code means for causing the computer to update the historical communications network bandwidth value after a transmission over the communications network.

* * * * *